United States Patent [19]
Beusink, deceased et al.

[11] 3,949,621
[45] Apr. 13, 1976

[54] ENDLESS BELT WITH TRAPEZOIDAL SECTION CONSTITUTED BY SUPPORTING MEMBERS

[75] Inventors: Bernard Joseph Beusink, deceased, late of Veldhoven-Oerle, Netherlands, by Johanna Margaretha Maria Beusink, heiress; Marinus Hubertus Cuypers; Alexandre Horowitz, both of Eindhoven, Netherlands

[73] Assignee: Varitrac AG, Zug, Switzerland

[22] Filed: Sept. 3, 1974

[21] Appl. No.: 502,495

[52] U.S. Cl................................ 74/231 M; 74/234
[51] Int. Cl.²....................... F16G 1/00; F16G 5/00
[58] Field of Search 74/231 M, 234, 233, 230.17 A, 74/230.17 C

[56] References Cited
UNITED STATES PATENTS

| | | | |
|---|---|---|---|
| 811,794 | 2/1906 | Riddell | 74/234 |
| 1,601,662 | 9/1926 | Abbott | 74/234 X |
| 2,920,494 | 1/1960 | Dodwell | 74/231 M |
| 3,175,410 | 3/1965 | Dittrich et al | 74/230.17 C |

Primary Examiner—Leonard H. Gerin
Attorney, Agent, or Firm—Haseltine, Lake & Waters

[57] ABSTRACT

The trapezoidal cross-section or profile of an endless driving belt is shaped by means of an uninterrupted row of thin metal plates transversely mounted on a metallic pull band over the entire length thereof. The plates are pressed against each other by tensile stress in the pull band. The pull band may advantageously be subdivided into two separate, parallel band strips each these two strips being inserted from oppisite sides in sideward slots provided in the metal plates. The alignment of each plate in a plane perpendicular to the longitudinal direction of the band is maintained by coupling means between all contiguous plates preventing lateral shifting of each plate with respect to its adjoining plates but allowing a slight mutual tipping of the plates around an axis perpendicular to the longitudinal direction of the pull band and parallel to the plane thereof.

20 Claims, 10 Drawing Figures

ENDLESS BELT WITH TRAPEZOIDAL SECTION CONSTITUTED BY SUPPORTING MEMBERS

BACKGROUND OF THE INVENTION

1. Field of the Invention

The invention relates to an endless driving belt with a trapezoidal cross section more especially for use in variators. The trapezoidal cross section is shaped by means of an uninterrupted row of members transversely mounted on a metallic pull band over the entire length thereof and each of said transverse members has a cross section which tapers inwards from the endless metallic band in order to allow the bending of the pull band along a desired radius of movement between conical surfaces of variator discs. During this bending of the pull band the transverse members are slightly tilted each around an axis perpendicular to the longitudinal direction of the pull band and parallel to the plane thereof.

The aforesaid tapering is necessary for preventing the bending of the pull band being impaired by portions of the transverse members inwards from the endless pull band striking each other.

2. Description of the Prior Art

It is known in the art to limit the mutual contact between rather thick or even block-shaped transverse members which were used to a locally fixed line of contact which was effective as an axis of tilt. Also members were used having, e.g. due to a rubber cover, at least on their surface a rather great elasticity allowing compression of the transverse member portions inward from the neutral line on bending of the belt in curves.

SUMMARY OF THE INVENTION

It is an object of the invention to obtain that great forces can be transmitted by means of transverse members of simple construction which in mass production can be cheaply manufactured especially for use in variators. Further objects are to ensure an advantageous distribution on the transmission forces from the transverse members on the conical surfaces of variator discs, a moderate wear, a great efficiency (little heat development), great transmission power and a quiet running with little noise.

Starting from the aforementioned state of the art the invention and advantageous embodiments thereof are defined in the accompanying claims and described hereinafter with reference to the drawing representing some embodiments.

DESCRIPTION OF THE FIGS. OF THE DRAWING

Figure 1:
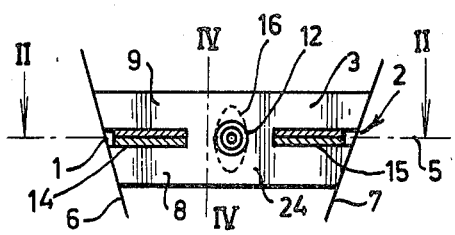
FIG. 1 is a cross section on the line I—I of FIG. 2 through a twin pull band hereinafter referred to as "carrying band" or "pull band" on which in FIG. 2 only two transverse members of a row of members according to the invention are shown.
Figure 2:
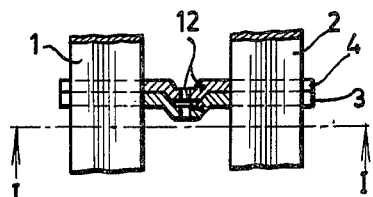
FIG. 2 is a section on the line II—II in FIG. 1.
Figure 5:
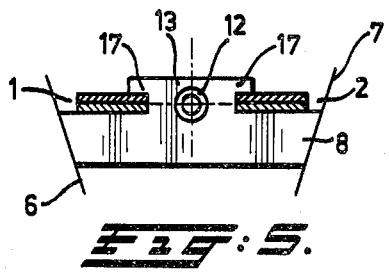
FIG. 5 is a section analogous to that in FIG. 1 for a modification.

From FIGS. 1, 2 and 5 it is visible that the supporting part or a carrying twin pull band 1, 2 of and endless driving belt with trapezoidal shape is constituted by a metallic band package consisting of layers and that the band on its length is divided into two parallel longitudinal strips 1 and 2. An uninterrupted row of transverse members like denoted by 3 and 4, determining the trapezoidal shape of the driving belt is, as seen in their longitudinal direction, transversely disposed on the band.

For the sake of simplicity the transverse members 3, 4 and the layers of the band are represented with exaggerated thickness. In FIGS. 1, 5, 6 and 7 only two layers of the pull band are shown but in reality the pull band may be constructed from a great number of elementary steel bands of corresponding small thickness.

Figure 6:
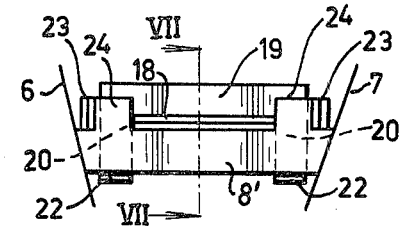
FIG. 6 is a view to FIG. 1 of a modified transverse member.

In the FIGS. 1, 5 and 6 is further indicated how the driving belt in operation is confined between the conical surfaces 6 and 7 of a pair of cone pulleys. This driving belt can be used for a variator with stepless regulation of the speed of rotation.

Figure 4:
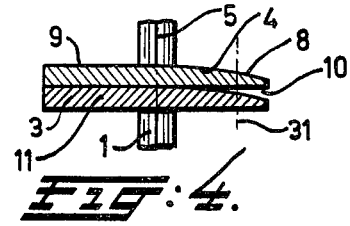
FIG. 4 shows likewise on a larger scale a section on the line IV—IV in FIGS. 1 and 3.

A camber of the plate-shaped members 3, 4 is, as denoted by 10, resp. 11, in FIG. 4, limited to one side of the members and to the portion which with respect to the plane of the endless pull band is inwards situated. The portions 12, 13 of the plate situated outwards from the closed pull band have in this case a rectangular cross section. However, if in view of the construction and manufacture this would be simpler, a camber may also be provided on the two opposite surfaces of the plates and in that case the cambers have the double radius of curvature with respect to that according to FIG. 4. This camber of the portions of the cross members, which are inwards situated with respect to the pull band is essential although if desired also the outwards situated portions could have a camber. In each embodiment the camber extends, however, into the area of the neutral line which is situated in the stretched parts of the pull band in the plate 5 (FIG. 1).

The cambered surface portions have a radius of curvature which is a multiple of the thickness of the transverse member and for the camber a cylindrical shape can be advantageously selected with a centre of curvature which is in the neutral line of the band 1, 2.

The strips 1, 2 of the pull band are on either side of the row of transverse members 3, 4 . . . and so on, fittingly sidewise inserted into sidewards directed slots 14, and 15 formed between the lower part 8 and the upper part 9 of each transverse member (FIG. 1).

In order to ensure that in the operative position even with the maximal load which may be applied, the transverse members and the two parts of a driving belt, passed over two pairs of variator pulleys, yet transmit compressive forces, the metallic pull band 1, 2 is prestressed to predetermined extent by the total thickness of the continuous row of transverse exceeding the length of the unstressed pull band. The torque arises from the difference of the resulting pull in the upper and lower section of the belt package in operation on pulleys; the pull in each section is composed of tension in the metallic belt package and pressure between the transverse members, so that the pull in a metallic band package is always greater than the compressive force between the corresponding transverse members. The metallic belt package 1, 2 bears exclusively on the transverse members 8, 9 which on their turn bear on the conical surfaces 6, 7 for which reason such transverse members can also be indicated as supporting members.

The thickness of the transverse members at the location whereat the band bears on the members is for most applications smaller than ten times the elementary thickness of the metallic pull band (that is to say the thickness of one "layer" or "element" of the metallic belt package). Experience has shown that a driving belt with favourable properties can be obtained when the greatest thickness of a transverse member does not exceed 25 times the elementary thickness of the pull band.

With reference to the height (lower edge to upper edge) of a transverse member this means in practice in view of sufficient load capacity, that the height of a transverse member should be in a proportion of 8 : 1 to the thickness.

Since instead of comparatively thick blocks or discs a plurality of thin metal plates are used there is due to their great number a comparatively low specific load applied to the conical surfaces. It is no longer required to harden the transverse members, which has the effect of assisting the members to run in on the mostly hardened conical surfaces. Great circumferential velocities are permissible, while a noiseless running becomes possible since a polygonal effect is practically absent. On account of their great number the camber of the contact surface between consecutive members need only be small and its radius of curvature can therefore be large, whereby the contact area is greater, the pressure per unit of surface low and as a consequence the wear owing to pressure is negligible.

Preferred embodiments of the invention are connected with the observation that hin transverse members in the operative condition tend to assume an oblique position, whereby the contact line with the pull band is no longer perpendicular to the center line tereof. As a consequence the bias in the pull band increases intolerably.

For obtaining the said oblique position the transverse members must turn to some degree around an axis which is perpendicular to the plane of the pull band, which results inevitably in a minor shift of the members with respect to each other parallel to their surface. Means are now discussed by which such an oblique position is avoided by preventing a mutual shift in a direction transverse to the pull band. This prevention is obtained by means of a mutual coupling of the transverse members leaving no play in a transverse direction, whereby the members remain directed in their original arrangement.

In the embodiment according to the FIGS. 1–5 the transverse coupling is effected by means of suitable conical bulges 12 provided in each of the consecutive transverse members 3, 4 in the centre line thereof, while always a conical bulge is situated in the conical cavity of the conical bulge of an adjacent member.

As in the embodiments of FIGS. 1–4 the portions of the transverse members which are inward and outward from the pull band both bear on the conical surfaces 6, 7, as according to FIG. 1, the material stress in the transverse members is considerably reduced. This allows a light construction as the moment of torsion caused by forces at the transverse member portions inward and outward from the pull band is practically eliminated.

In the embodiments according to FIGS. 5–8, however, the inwards turned portions 8, 8' should be heavier because only they provide the transmission of force to the conical surfaces 6, 7. These forces applied under the neutral line will exert a certain moment of torsion on the transverse members, which should also be taken up by the conical surfaces 16.

According to FIG. 5 the outwards turned portion 17 of the transverse plate is reduced to a minimum required for securing it in position on the belt package strip 1, 2 by means of the overhanging lugs 17.

Figure 7:
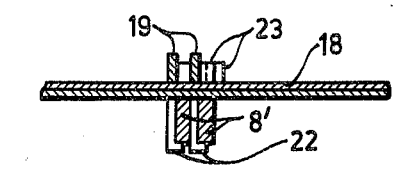
FIG. 7 is a cross section according to the line V—V of FIG. 6.
Figure 8:
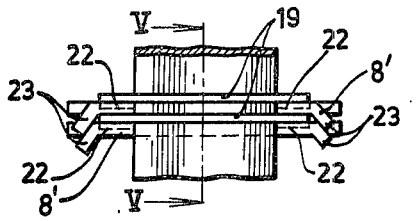
FIG. 8 is a plan view of the transverse member according to FIG. 6.

In the realization according to the FIGS. 6 to 8 the plateshaped transverse members engage the discs 6, 7 practically only inwards from the metal belt package 18 and the transverse members are each composed of two parts 8' and 19 and the lower parts 8' are all cambered on the same side. This embodiment allows the application of a pull band 18 which is not split into two parallel strips. The pull band is enclosed between two parts 8' and 19 of the transverse member. The part 19 consists of an "intermediate" U-shaped plate inserted upon the outer side of the band 18 and the legs 20 of the U engage the flat sides of the part 8'. The ends of these U-legs 20 are bent over in such a way that lips 22 are formed engaging the lower edge of the part 8' so that the two part 8' and 19 are connected together around the pull band 18.

FIGS. 6–8 also show another embodiment of a mutual transverse coupling of the transverse members, which is effected in the neutral area or just outside that area and as well as in the embodiments of FIGS. 1–5 by means of members which are inclined in such a way with respect to a plane brought through the lines of contact of the transverse members in the straight parts that in these straight parts a part of the compressive forces between the supporting members is taken over by these coupling members. As a consequence a complete freedom from play in the transverse direction is ensured. The coupling members have no function on the cone pulleys 6, 7.

The transverse coupling is effected by obliquely bent outward lips 23 of the portions 24 of the plate-shaped transverse member 8', which are situated just over the neutral line. These lips 23 of the one transverse member 8' are engaged about those of the next transverse member. It is evident that the transverse members 19 constitute a flat, thin filling piece between the transverse members 8'. They should be slightly thinner than the space between the transverse members 8' so that when those are pressed against each other in mutual parallel position the lips 22, 23 can be slightly deformed untill these as well as the cambers on the parts 8' can transfer part of the load in operation.

In the FIG. 1 is indicated by a dotted line 16 that the cone could also be oblong, but the long axis of the oval cross section should then be perpendicular to the plane 5 of the pull band.

It is not necessary that the vertex is provided with a hole like in the embodiment shown in the drawing.

Figure 3:
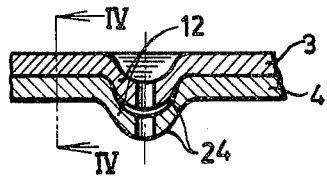
FIG. 3 shows on a larger scale the central part of the section according to FIG. 2.

When the cone 12, 16 is manufactured by forcing out the material it is shaped slightly higher than in the final configuration according to FIG. 3, which in a next manufacturing step is ensured by pressing the plates against each other. This step is of special importance for taking away any play as is desirable. This freedom of play is maintained in operation as during operation also a certain plastical deformation of the cone is produced until the plates according to a horizontal line of contact and also on the circumference of the cone 16 bear against each other. In order to facilitate this the bulge 16, 12 can be shaped slightly curved as denoted by 24 in FIG. 3.

Figure 9:
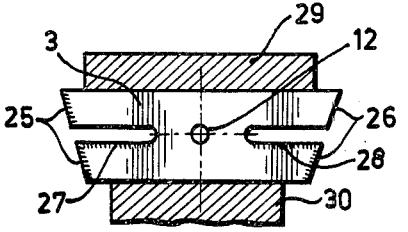
FIG. 9 is a cross section on the line IX—IX of FIG. 10 illustrating a subsequent treatment of the transverse members and FIG. 10 is a side elevation to FIG. 9.
Figure 10:
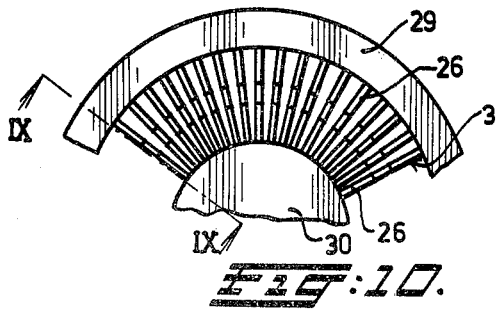

In the FIGS. 9 and 10 is shown how the plates together, on the lateral surfaces 25, 26 and on the bearing surfaces 27, 28 for the pull band, can be exactly finished to the same size. For this purpose the whole package of plates to be disposed on the pull band is fixed between a surrounding ring clamp 29 and a cylindrical disc 30. The surfaces 27, 28 can then be turned off and the sides 25, 26 flat ground. For the sake of surveyability the plates are shown in FIG. 10 at some distance from each other though in reality they contact each other during this treatment.

It is alo possible to construct some of the transverse members slightly thicker or thinner than the normal members. In assembling it is possible to ensure the desired pre-tension by a suitable combination of the normal and differing transverse plates.

In thicker supporting members like blocks it is requisite to finish the bearing surface, at the location at which the pull band bears on the supporting surfaces of the slits (14, 15, FIG. 1) with a curvature such that its radius is equal to the smallest radius of the metallic belt package which can possibly require a rather expensive treatment.

The use of a great number of thin metal plates as transverse members has in this respect the advantage that the aforementioned bearing surfaces can be maintained flat without additional bending stresses being produced in the metallic bands.

In relation to the radius of camber of the surfaces of the plates it should be noted that it should be sufficiently great to keep the tension of contact under the permissible limit.

With the known application of one predetermined axis of tilt this was practically impossible.

The desired bias in the pull band can be obtained when the annular shape changes into the operative shape.

In case of a sufficiently great radius of curvature the annular metalic belt package which is closed in itself can even be tensionless when in annular formation because the line of contact moves inwards when the curvature increases and the transverse members, when the radius of movement is further reduced, starts occupying space to an increasing extent with respect to the length of the metallic band package.

The area of contact between the transverse members is defined as a rolling area. Inwards from this rolling area the delimitation of which is indicated in FIG. 4 by the line 31, the camber can be continued by a flat plane onto the lower edge of the plates.

What is claimed is:

1. An endless driving belt with a trapezoidal cross section which is shaped by a series of metal plates in close contact with one another transversely mounted on a metallic pull band as an uninterrupted row over the entire length thereof, each of said transverse members having a cross section which tapers inwards from the endless metallic band, said metal plates being provided in an uninterrupted row along the whole length of said pull band, the total thickness of all of said transverse metal plates as measured in the plane of the said pull band exceeding the length of said pull band in its original unstressed condition to such an extent as to obtain an intensity of tensile stress in said endless band wherein, in any operative position thereof, said transverse plates are pressed against each other.

2. A driving belt according to claim 1, characterized in that exclusively metallic transverse members are used, the thickness of each of which does not exceed 10 times the thickness of a pull band element.

3. A driving belt according to claim 1, characterized in that contiguous transverse members are coupled with each other by coupling means allowing to each of them a light turning around an axis parallel to the surface and perpendicular to the longitudinal direction of the pull band but preventing them from any shifting laterally with respect to each other in the direction of this axis, so that an oblique position of the transverse members with respect to the aforementioned longitudinal direction is prevented in the rectilinearly extending parts of the pull band.

4. A driving belt according to claim 3, characterized in that the coupling means shape areas of contact between contiguous transverse members to a plane brought through the lines of contact between those transverse members in the restilinearly extending parts of the pull band a part of the pressure between the transverse members being received by those inclined faces.

5. A driving belt according to claim 4, characterized in that the consecutive transverse members have each in their center line an identically directed conical bulge, each conical bulge being received in the conical cavity of the corresponding bulge of an adjacent plate.

6. A driving belt according to claim 4, characterized in that the coupling means are constituted by side edge lips of the transverse member plates said lips being situated outwards from, but near the neutral area and bent over in the same direction in such a way that each plate is laterally enclosed between the bent over lips of an adjoining plate, only the portion of the plates which is inwards from the neutral area being shaped in conformity with the desired trapezoidal section of the driving belt.

7. A driving belt according to claim 1, characterized in that the transverse members have cutouts which allow the pull band to be slid thereinto in a direction perpendicular to the longitudinal direction of the band.

8. A driving belt according to claim 7, characterized in that the pull band is subdivided into parallel, separated, longitudinal strips, while on either side of the row of transverse members one of the strips is fittingly slid into the laterally directed slots provided in the transverse members.

9. A driving belt according to claim 7, characterized in that the supporting faces for the pull band on the edges of the transverse members are flat in a plane at right angles to the main faces of the transverse members.

10. A driving belt according to claim 7, characterized in that in the slots in the transverse members, the supporting faces for the pull band for all plates disposed on the pull band are together finished in one cylindrical plane.

11. A driving belt according to claim 1, characterized in that the pressure areas of the transverse members are provided with a camber such that at any circle of curvature of the belt which may occur in operation the pressure areas of contiguous transverse members contact each other without, however, surpassing a predetermined permissible contact tension in any operative condition.

12. A driving belt according to claim 11, characterized in that camber of the transverse members is restricted to a rolling area along which the said members come into contact with each other when the belt is curved in operation.

13. A driving belt according to claim 11, characterized in that the length of the pull band is dimensioned with respect to the total thickness of the transverse members in a plane comprising the lines of contact between these members when the driving belt takes the configuration of a circular cylinder in such a way that the pull band in this position is almost tensionless, but that the total band only by producing a tensile stress therein can be forced out of this cylindrical configuration.

14. A driving belt according to claim 11, characterized in that only a portion of the transverse members on one side thereof and inward from the neutral line is cambered.

15. A driving belt according to claim 14, characterized in that the pull band is enclosed between two parts of which each transverse member is composed, one part of consecutive plates inward from the neutral area being cambered always on the same side and shaped in conformity with the desired trapezoidal section of the driving belt, the second part being inserted from outside the neutral line and having stripshaped portions extending inwards from the neutral area along the flat sides of the adjoining cambered transverse member part the ends of said strips being bent over under the lower edge of the said transverse memberpart.

16. A driving belt according to claim 11, characterized in that into the row of transverse members are incorporated intermediate members and/or cambered transverse members with a thickness smaller or greater than that of the other former and/or latter transverse members.

17. A driving belt according to claim 1, characterized in that the material used for the transverse members is less hard than that of the carrying pull band and than that of the conical surfaces of the pair of cone pulleys of the transmission in which the driving belt is used.

18. A driving belt according to claim 1, characterized in that the opposite edges of the transverse members, which come into contact with the conical surfaces of a transmission and which are inclined toward each other are together flat finished in one plane.

19. A driving belt according to claim 1, characterized in that the proportion of the height of each transverse member to the greatest thickness thereof is 8 : 1.

20. A driving belt according to claim 1, characterized in that exclusively transverse members are used having a thickness of at most 25 times the thickness of a pull band element.

* * * * *

UNITED STATES PATENT AND TRADEMARK OFFICE
CERTIFICATE OF CORRECTION

PATENT NO. : 3,949,621

DATED : April 13, 1976

INVENTOR(S) : Bernard Joseph Beusink, et al

It is certified that error appears in the above-identified patent and that said Letters Patent are hereby corrected as shown below:

Between lines 9 and 10 insert the following:

Claims priority, application Netherlands August 31, 1973, 73.12089

Signed and Sealed this

Twenty-fourth Day of August 1976

[SEAL]

Attest:

RUTH C. MASON
Attesting Officer

C. MARSHALL DANN
Commissioner of Patents and Trademarks